United States Patent [19]
Peacock

[11] 4,403,391
[45] Sep. 13, 1983

[54] MACHINE TOOL INCLUDING A TOOL TRANSFER MECHANISM

[75] Inventor: Colin J. Peacock, Long Buckby, England

[73] Assignee: De Vlieg Machine Company Ltd., Lutterworth, England

[21] Appl. No.: 252,036

[22] Filed: Apr. 8, 1981

[30] Foreign Application Priority Data

Apr. 15, 1980 [GB] United Kingdom ............... 8012396

[51] Int. Cl.³ ............................................. B23Q 3/157
[52] U.S. Cl. ..................................................... 29/568
[58] Field of Search ............... 29/568, 26 A; 414/626, 414/753

[56] References Cited

U.S. PATENT DOCUMENTS

| 3,161,951 | 12/1964 | Anthony | 29/568 |
| 3,780,423 | 12/1973 | Lillenthal et al. | 29/568 |
| 3,820,234 | 6/1974 | Poinlenot | 29/568 |
| 3,822,466 | 7/1974 | Noguchi et al. | 29/568 |

FOREIGN PATENT DOCUMENTS

| 2655913 | 6/1978 | Fed. Rep. of Germany | 29/568 |
| 136471 | 7/1979 | German Democratic Rep. | 29/568 |

Primary Examiner—William R. Briggs
Attorney, Agent, or Firm—Trexler, Bushnell & Wolters, Ltd.

[57] ABSTRACT

A machine tool comprises a work head in which tools are mounted in use and which is movable along a main beam in a Y machining direction. A tool selected from a tool storage matrix is held at an exchange position in readiness for exchange with a tool mounted on the work head. A carriage is movable along a subsidiary beam in a direction parallel to the Y machining direction and carries a pair of tool grippers. During a tool change, one of the grippers takes the tool from the exchange position and holds the latter while the carriage moves to the work head where it latches onto the latter by means of a latch device. The other gripper then removes the tool from the work head, whereupon said one gripper inserts the replacement tool in the work head. The carriage then unlatches from the work head and moves away therefrom, so that said other gripper can return the removed tool to the exchange position. In order that tools can also be exchanged in a right-angle head when the latter is attached to the work head, the grippers are each capable of an angular wrist-action movement.

8 Claims, 23 Drawing Figures

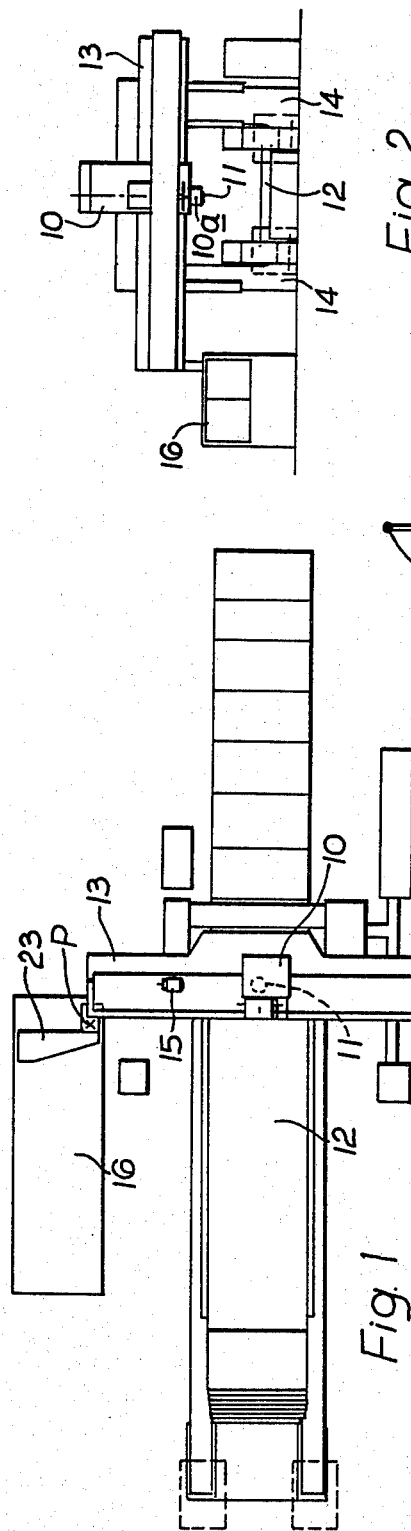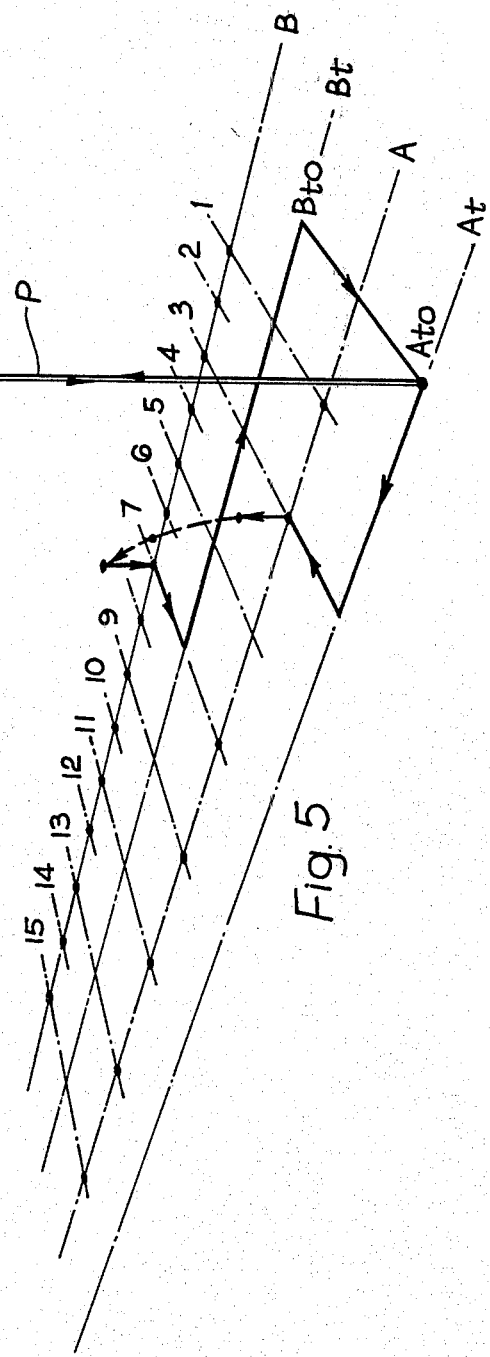

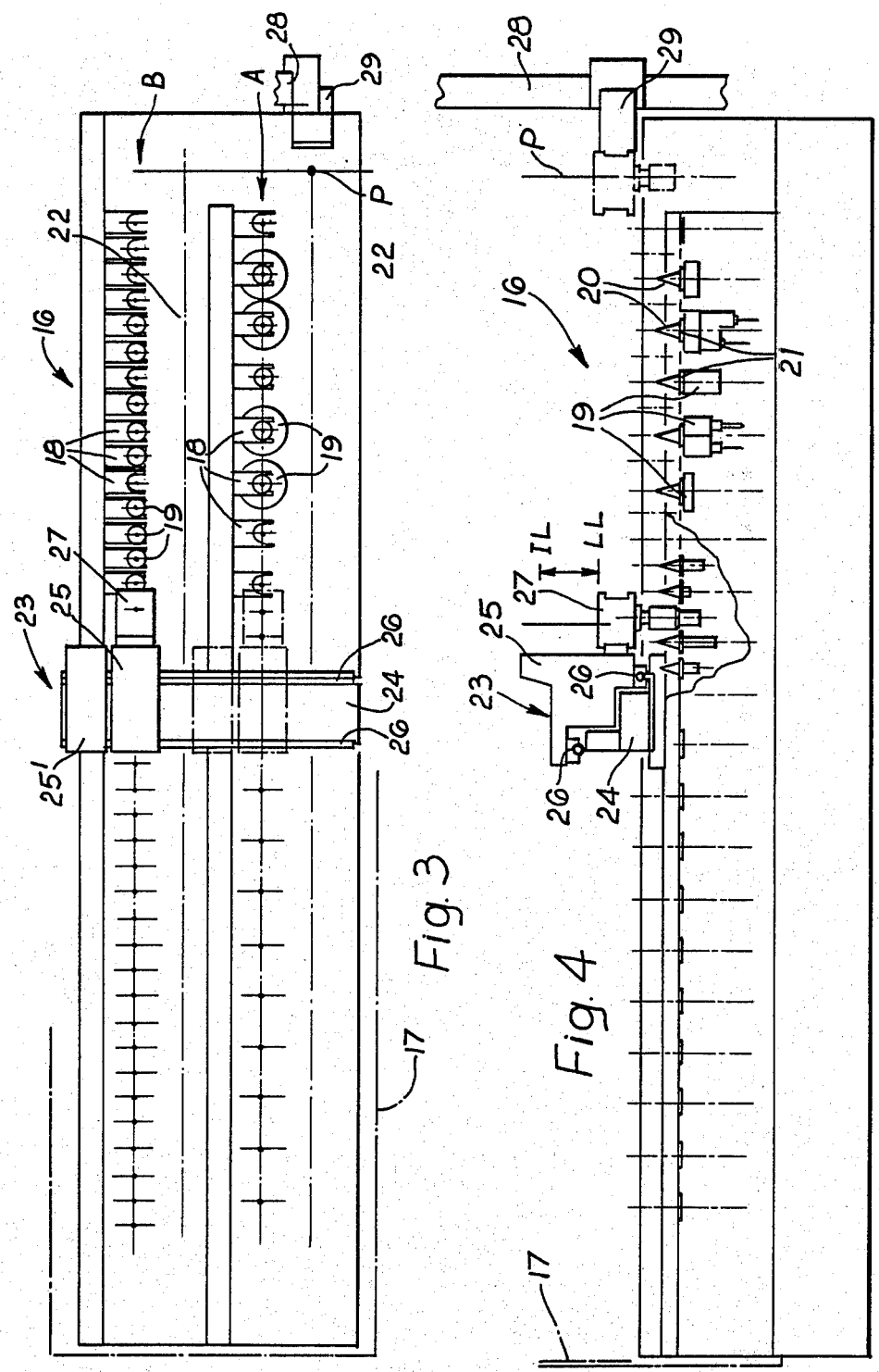

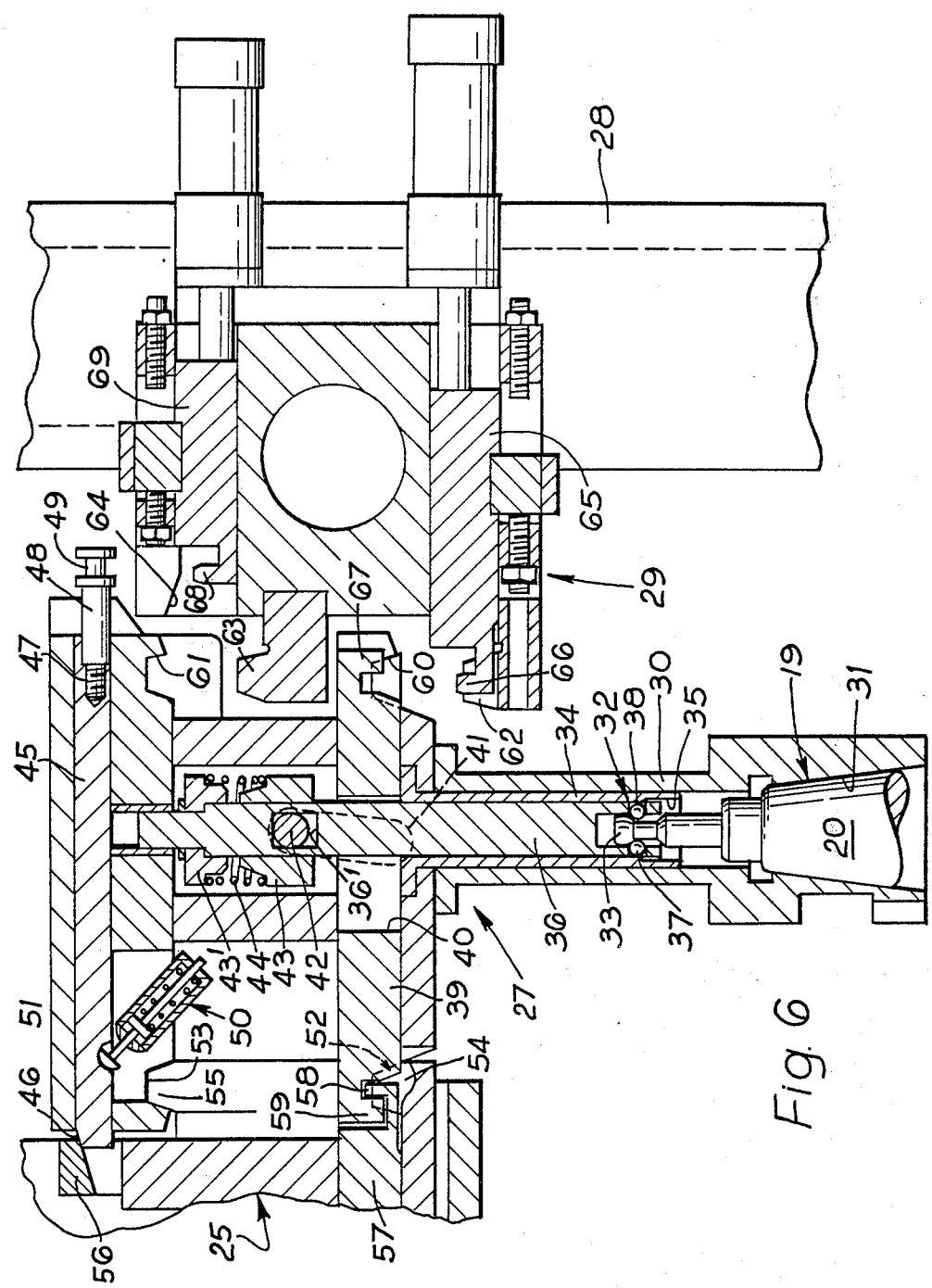

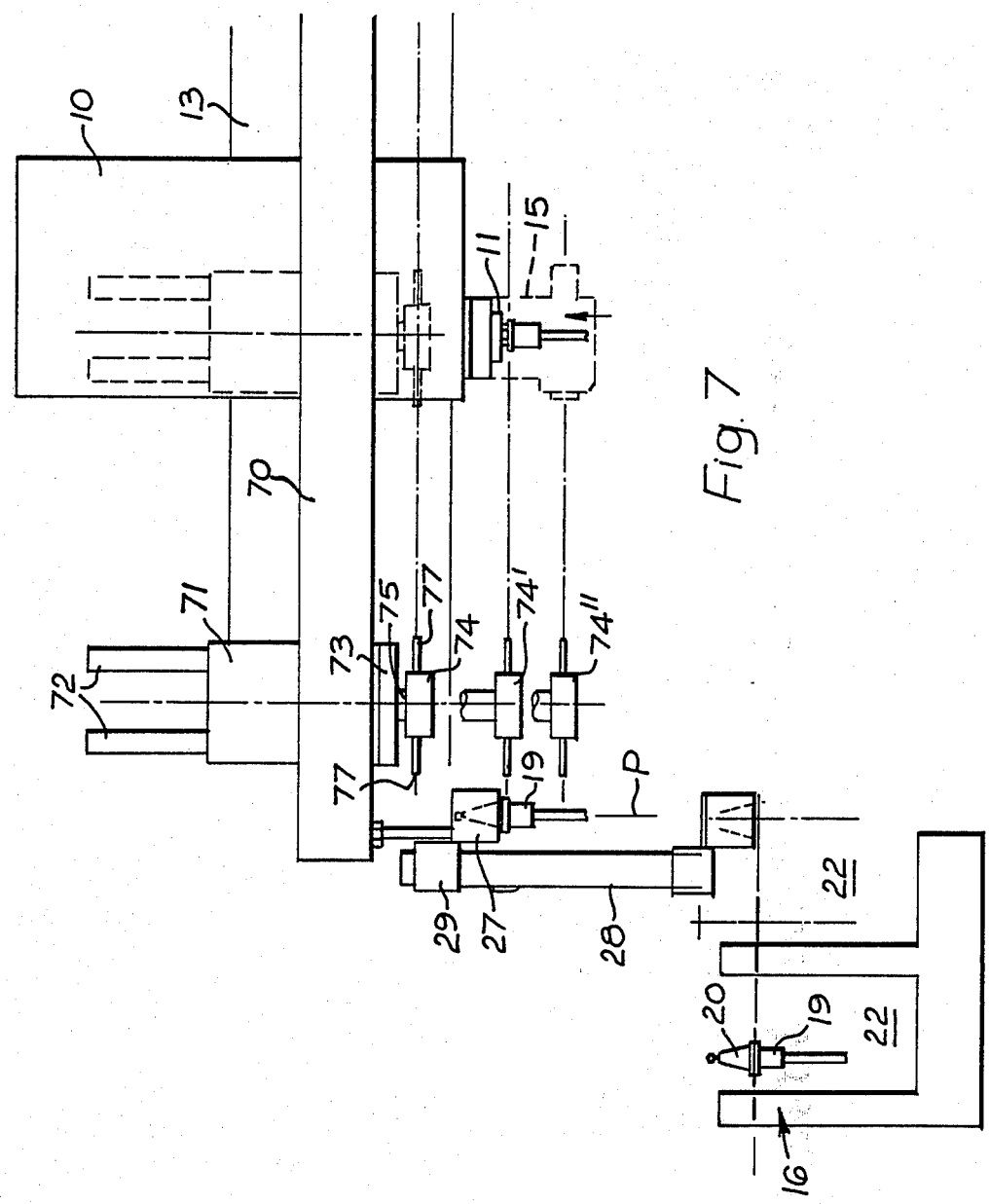

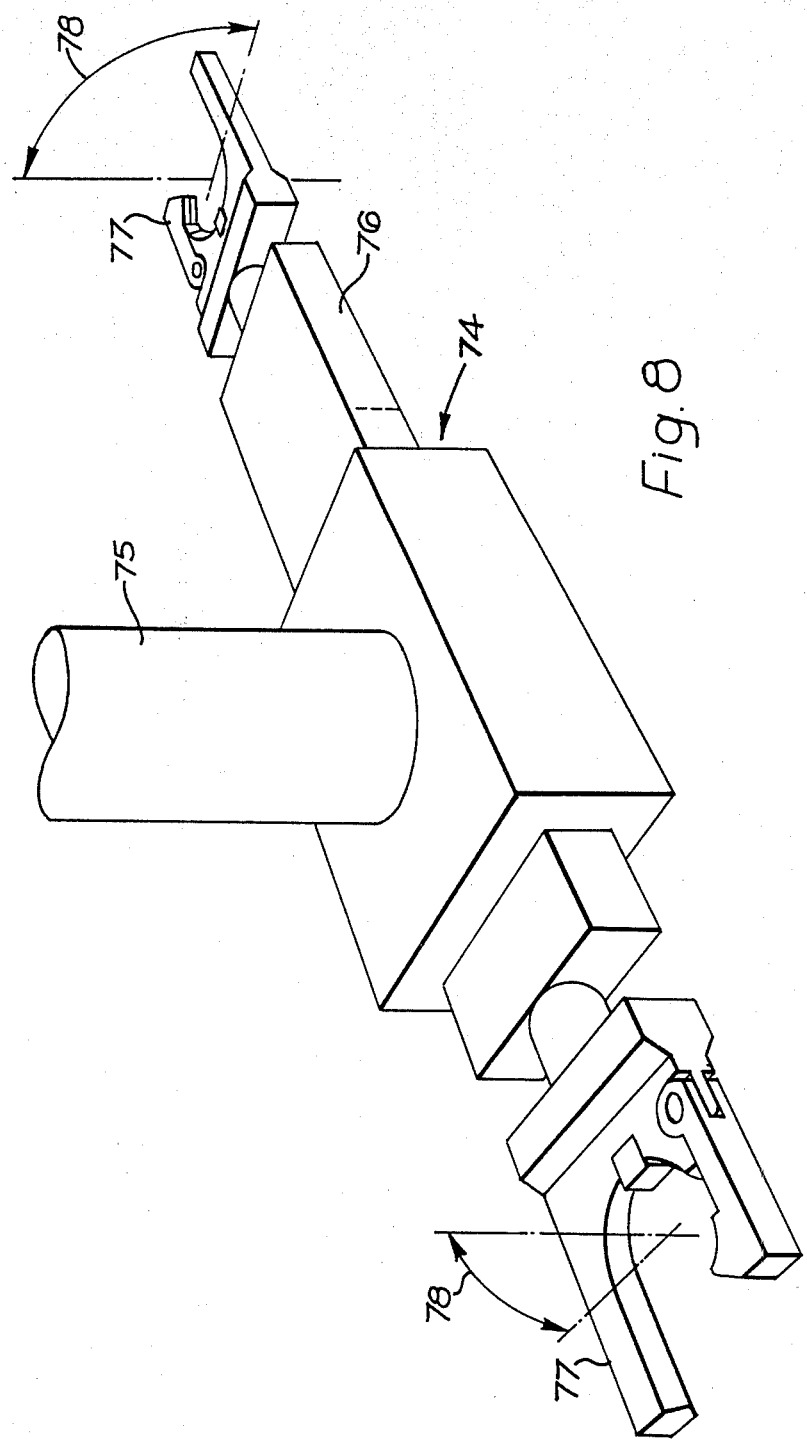

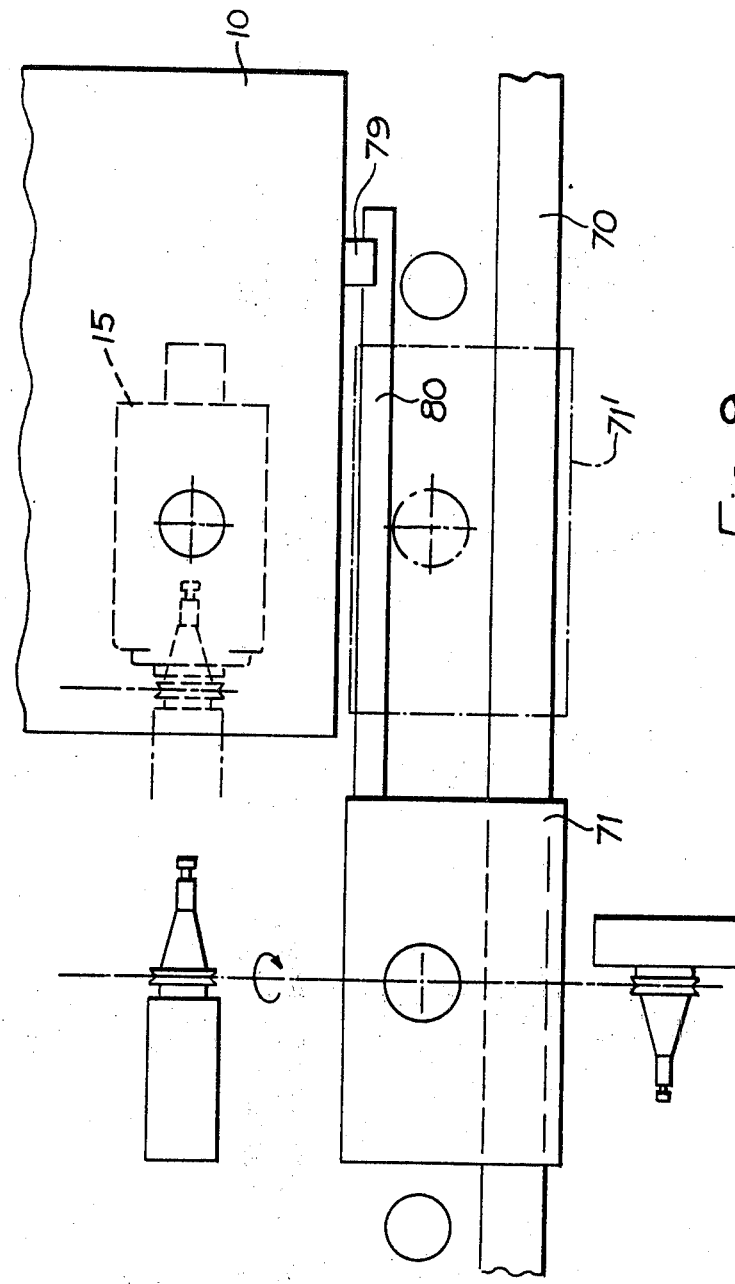

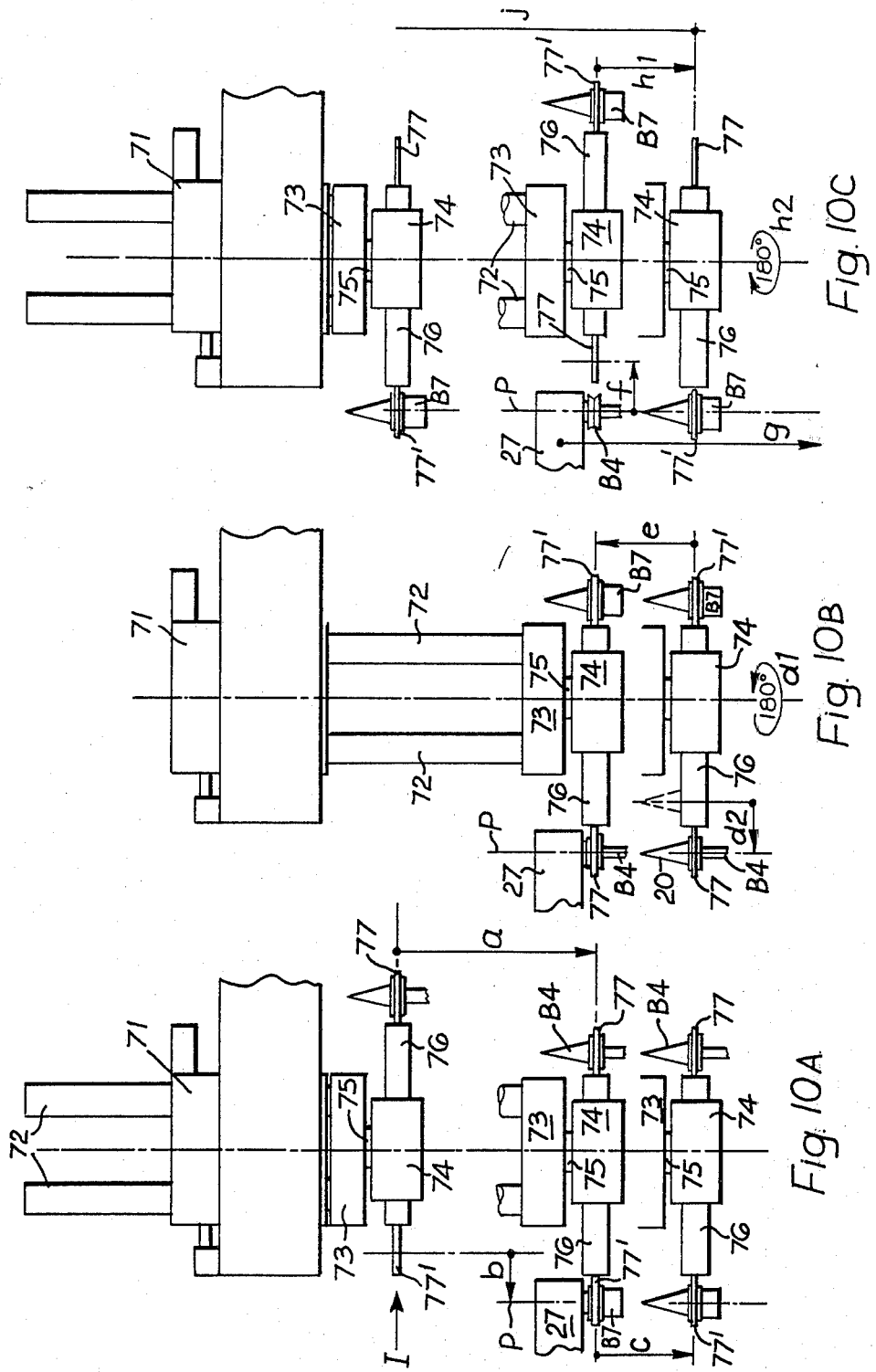

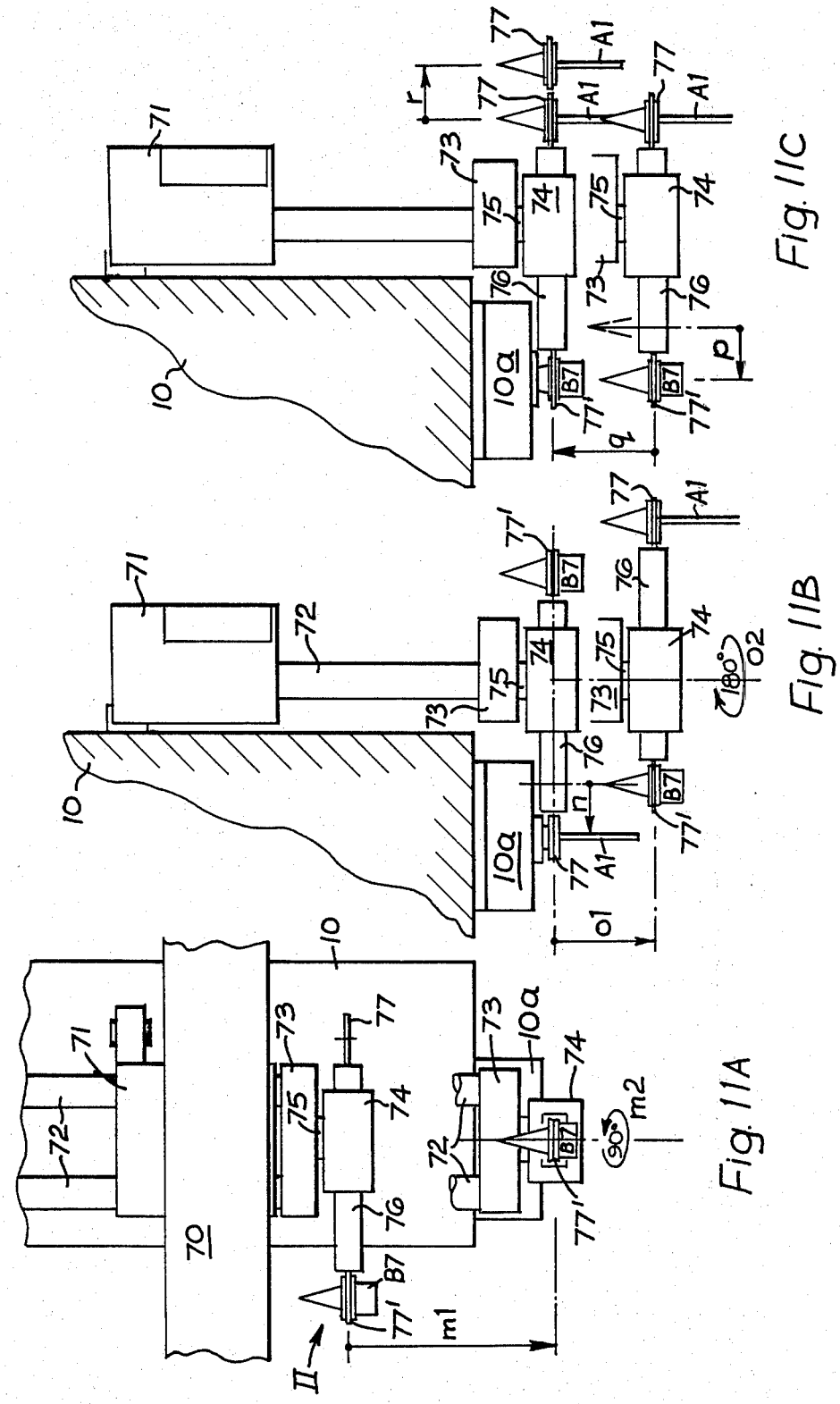

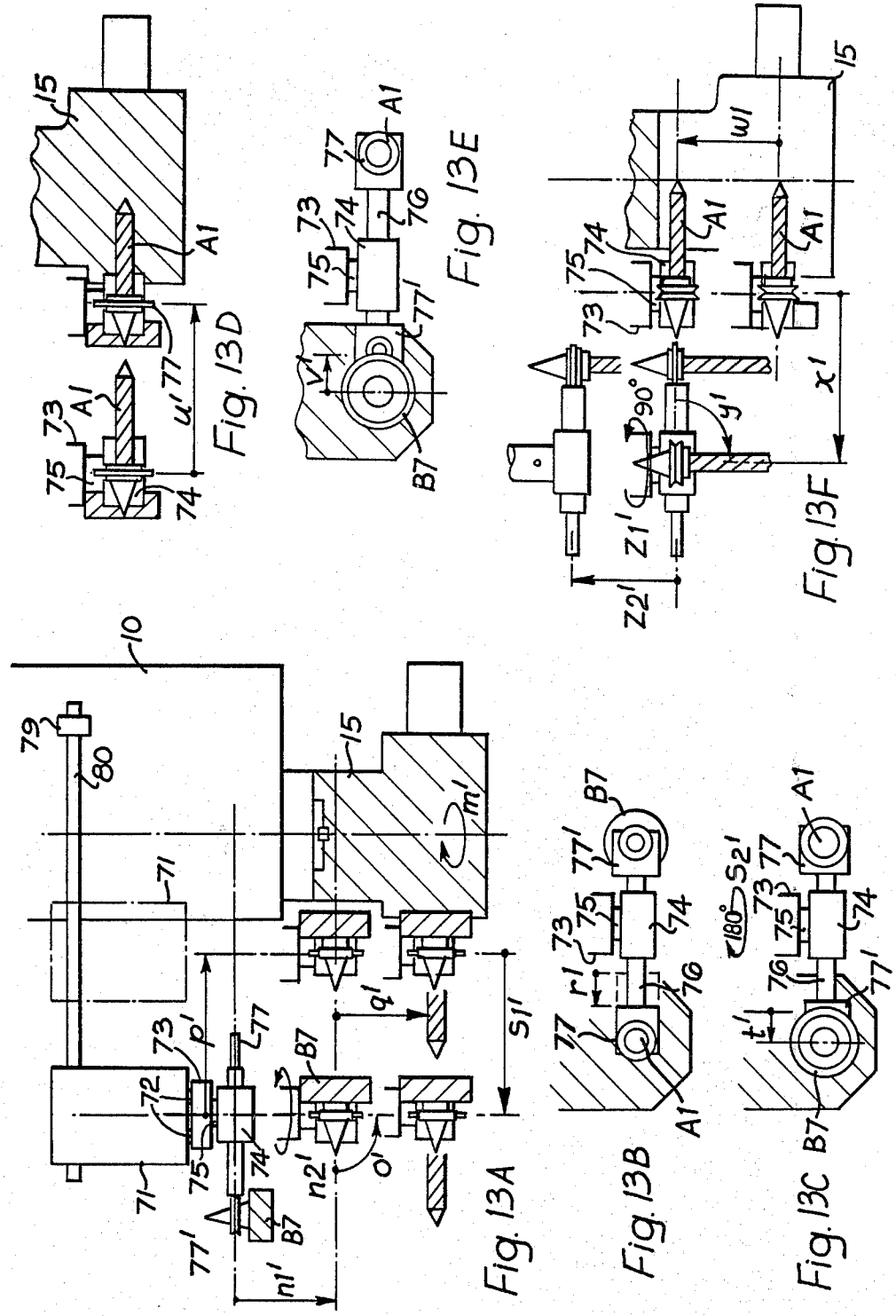

MACHINE TOOL INCLUDING A TOOL TRANSFER MECHANISM

This invention relates to a machine tool including a tool transfer mechanism.

According to the present invention, there is provided a machine tool comprising a work head movable in a predetermined direction and adapted to mount a tool, a tool exchange location where tools are presented for mounting in the work head and are received after removal from the work head, and a tool transfer mechanism for changing the tool mounted in the work head, the tool transfer mechanism including a carriage movable in said predetermined direction between the work head and the tool exchange location, latch means operable to latch the carriage to the work head for movement therewith in said predetermined direction, and a pair of tool grippers carried by the carriage, one of the tool grippers being arranged to grip a tool removed from the work head during movement of the carriage from the work head to the tool exchange location, the other tool gripper being arranged to grip a replacement tool for mounting in the work head during movement of the carriage from the tool exchange location to the work head.

Preferably, the latch means includes an arm which can be extended and retracted relative to the carriage in said predetermined direction, and a latch device for latching the arm to the work head. In this way, when the carriage is latched to the work head, its position relative thereto can be altered by extending or retracting the arm.

Advantageously, each tool is presented at the tool exchange location in the same orientation as it is normally mounted in the work head, and each tool gripper is capable of angular movement to change the orientation of the tool.

Preferably, each tool gripper is angularly movable about an axis generally perpendicular to the direction in which each tool is normally inserted into and removed from the work head. In this way, when a right-angle head is fitted to the work head to change the operation axis thereof, the tool orientation can be altered correspondingly by suitable angular movement of the tool grippers.

Desirably, each tool is normally inserted into and removed from the work head by relative movement between the tool and the work head in a preselected direction, and the tool grippers are both carried by an arm mounted on the carriage for rotation about an axis generally parallel to said preselected direction, the arm preferably also being movable relative to the carriage in a direction transverse to said preselected direction.

Conveniently, the arm is movable in said preselected direction between a first position in which a tool mounted in the work head can be gripped by one of the tool grippers, a second position in which the arm can rotate without obstruction by the work head, and a third, rest position which the arm normally occupies during movement of the carriage between the work head and the tool exchange location. Preferably, the tool exchange location is at the same level as said first position with respect to said preselected direction.

An embodiment of the present invention will now be described, by way of example, with reference to the accompanying drawings, in which:

FIG. 1 is a plan view of a portal frame machine tool equipped with a tool-changing device according to the present invention;

FIG. 2 is an end view of the portal frame machine tool shown in FIG. 1;

FIG. 3 is a plan view of a tool storage matrix which forms part of the tool-changing device;

FIG. 4 is a side view, partly in section, of the tool storage matrix;

FIG. 5 is a diagram illustrating a typical operation of the tool storage matrix;

FIG. 6 is a sectional side view of a shuttle and an elevator which form part of the tool-changing device;

FIG. 7 is an end view of a tool transfer and interchanger mechanism which also forms part of the tool-changing device;

FIG. 8 is a perspective view of an interchange arm of the tool transfer and interchange mechanism;

FIG. 9 is a schematic plan view of the tool transfer and interchange mechanism;

FIGS. 10A to 10C show a sequence of operations of the tool transfer and interchange mechanism during tool changing;

FIGS. 11A to 11D show a subsequent sequence of operations during tool changing when a work spindle of the machine tool is oriented vertically;

FIGS. 13A to 13F show in side and front view various stages in the same sequence of operations.

Figure 11D:
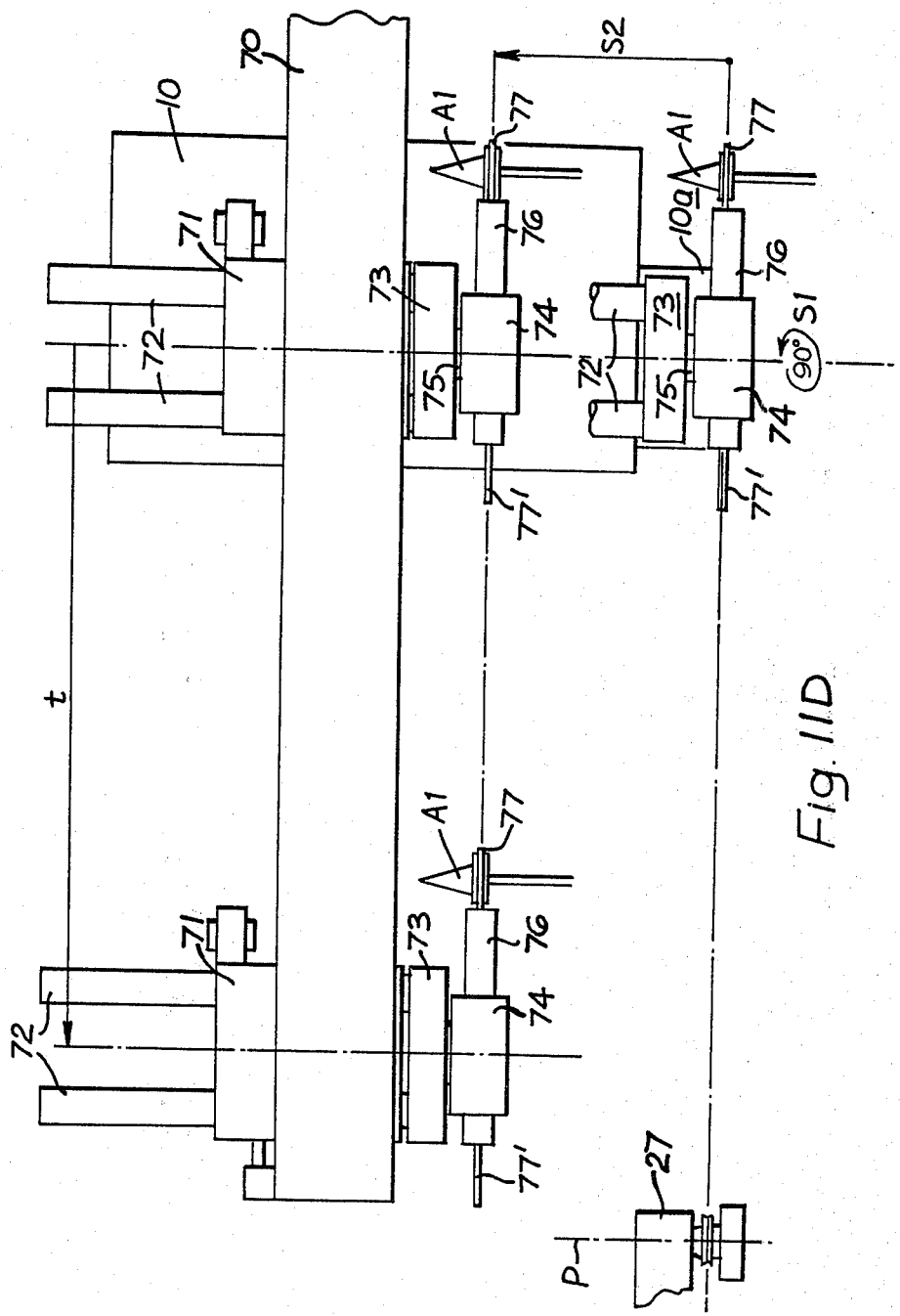

FIGS. 1 and 2 show a tool-changing device according to the present invention as applied to a portal frame machine tool, although it will be appreciated that the invention is also applicable to other forms of machine tool. The portal frame machine tool comprises a spindle head 10 having a ram 10a which contains a rotatable work spindle 11 and a table 12 on which workpieces to be machined are mounted in use. The work spindle 11 and the table 12 are relatively movable along the mutually perpendicular axes X, Y and Z of a rectangular co-ordinate system. Such relative movement along the X axis is achieved by longitudinal displacement of the table 12, along the Y axis by displacement of the spindle head 10 along a horizontal main beam 13, and along the Z axis by vertical displacement of the ram 10a. The spindle head 10 can be positioned at a suitable height above the table by upward or downward movement of the beam 13 on fixed vertical columns 14. From this, it will be apparent that the spindle head 10 is fixed against movement along the X axis.

The spindle 11 is rotatable about a vertical axis: however, for certain machining operations spindle rotation about a horizontal axis can be obtained by means of a right-angle head 15 which attaches to the spindle head 10. In FIG. 1, the right-angle head 15 is illustrated in a stowed position. The head 15 can be attached to an indexing unit (not shown) which is secured to the lower face of the ram 10a to enable machining operations to be performed on all four sides of a workpiece, the indexing axis being co-incident with the rotation axis of the work spindle 11.

Disposed to one side of the machine tool and arranged parallel to the table 12 is a tool storage matrix 16, shown in detail in FIGS. 3 and 4. The matrix comprises a steel cabinet 17 (only part of which is shown schematically in chain-dotted line) containing a plurality of fixed tool storage locations, each location being provided by a horizontally disposed U-shaped holder 18. A respective tool 19 is received in each holder 18 and is retained therein by suitable means, such as a spring-loaded catch (not shown), the tool including a tapered portion 20 by means of which it can be mounted in the work spindle 11 and a slotted flange 21 by means of which it is keyed to the work spindle in use. The flange 21 of each tool is supported in the respective holder 18 so as to support the tool therein with the tapered portion 20 pointing upwardly, the tool being held in an appropriate angular orientation by means of a locator (not shown) on the holder engaging in one of the slots in the flange 21.

The tool storage matrix can contain any suitable number of tool storage locations, and can serve more than one machine. Moreover, some storage locations can be designed to receive tools of smaller diameter, while others can be arranged to receive larger diameter tools, including light multiple tool heads. In the illustrated embodiment, the tool storage matrix occupies a floor area of approximately 1500 mm × 673 0mm, and comprises sixty tool storage locations arranged in two parallel rows A and B. In the row B there are forty locations each of which is designed to receive a tool of up to 120 mm diameter, while in the row A there are twenty locations intended for tools of up to 250 mm diameter, the locations in row A being spaced apart by twice the separation of the locations in row B. The locations in row A can also receive multiple tool heads for use with vertical or horizontal spindle orientations, provided that such heads are contained within a 250 mm diameter envelope. The maximum permissible tool length would be 400 mm. If required, holders for smaller diameter tools can be interposed between the holders for the larger diameter tools in row A.

Additionally or alternatively, two adjacent holders in row A can be provided on a common mounting plate to form a removable unit which can be replaced by a similar unit containing three holders for smaller diameter tools, similar to the holders in row B.

In order that additional tools can be accommodated where necessary, the tool storage matrix is composed of two separate sections which are arranged longitudinally end-to-end, and these sections can be separated to allow further similar sections to be interposed therebetween.

The above is only one example of many different arrangements which can be employed for the tool storage matrix. In an alternative example, the tool storage locations are arranged in three rows rather than just two, with the locations for the larger diameter tools being grouped in one of the rows. Whichever arrangement is employed, a channel 22 is provided alongside each row of tool storage locations, and all of the U-shaped holders 18 in the row open onto that channel to permit the stored tools to be removed from the holders and then moved along the channel in the same horizontal plane.

A tool selector device 23 is provided for transferring the tools 19 between their storage locations and a vertical pick-up axis P disposed adjacent one end of the main beam 13 of the machine tool. The tool selector device 23 comprises a carriage 24 mounted on suitable guides (not shown) for movement longitudinally of the tool storage matrix, and a pair of sliders 25 and 25' mounted on rails 26 carried by the carriage 24 for sliding movement relative thereto in a lateral direction with respect to the tool storage matrix. Movement of the carriage 24 along the guides and lateral displacement of the sliders 25 and 25' relative to the carriage are each effected by means of an hydraulic motor and a sprocket-and-chain drive or other suitable means. Preferably, the aforementioned guides are in form of supported bars, and the carriage 24 is mounted for sliding movement therealong with a minimum of friction by means of open-sided ball bushes contained in housings secured to the carriage 24, and by rollers and a flat way, or other suitable means Supported by the slider 23 is a shuttle 27 which grips the tools during their transference as aforesaid. The shuttle 27 is mounted on a vertical slide so that it can be moved vertically relative to the slider 25 by means of an hydraulic ram between a low level LL wherein it can grip the tapered portion 20 of a stored tool, and an intermediate level IL approximately 200 mm higher wherein the empty shuttle can move over the matrix of stored tools taking any convenient path. The slider 25 and hence the shuttle 27 can also be moved to a limited extent horizontally relative to the slider 25' in a direction parallel to the direction of movement of the slider with respect to the carriage 24, such movement being effected by means of a ram.

Adjacent the pick-up axis P there is disposed a vertical slide 28 on which an elevator 29 is mounted. After the tool selector device 23 has delivered the shuttle 27 to the pick-up axis at the aforementioned low level LL, the elevator 29 is arranged to receive the shuttle therefrom and raise the latter to a high level which is variable according to the height of the main beam 13 of the machine tool, where the tranported tool is held at an exchange position in readiness for transference to the work spindle. The construction of the shuttle 27 which makes this possible will be described in detail later.

A typical sequence of operations of the tool selector device will now be explained with reference to FIG. 5. The longitudinal and lateral positions of the tool storage locations within the matrix are suitably coded and individually programmable. The tools themselves are not coded, since each tool will be identifiable by the storage located which it occupies, the tool being returned so that location after use in the machine tool. For the purpose of this explanation, it will be assumed that a tool location in row B is coded Bn and that a tool location in row A is coded A(2m−1), wherein n is an integer between 1 and 40, and m is an integer between 1 and 20. The tool locations in the two rows are laterally aligned where $n = m - 1$, i.e. at each odd-numbered longitudinal location. It will also be assumed that a tool A3 has just been transferred from the machine tool to the shuttle 27 at the exchange position(referenced Ex), and that a tool B7 is to be loaded next. The sequence of operations is then as follows:

(i) The elevator 29 is lowered to the low level LL so as to move the tool A3 downwardly along the pick-up axis P to a position Ato (position Ato represents a zero co-ordinate on an axis At which runs along the channel 22 associated with the row A of storage locations: a similar axis Bt having a zero co-ordinate Bto is provided for the row B of storage locations).

(ii) At this position, the shuttle 27 is transferred from the elevator 29 to the slider 23 in a manner which will be described later.

(iii) The carriage 24 moves longitudinally of the tool storage matrix until the tool A3 is disposed opposite the holder 18 at its respective storage location.

(iv) The slider 25 advances shuttle 27 horizontally relative to the slider 25 to move the tool A3 into its holder. During this and the previous step the shuttle is maintained at its low level.

(v) The shuttle releases the tool A3 and is raised to its intermediate level IL above the tool.

(vi) With the shuttle 27 and the slider 25 maintained in their advanced position with respect to the slider 25', the sliders and the carriage 24 are moved by the shortest possible route to place the shuttle over the tool B7.

(vii) The shuttle is lowered to its low level LL so that it grips the tool B7.

(viii) The slider 25 retracts the shuttle 27 horizontally relative to the slider 25', thereby bringing the tool B7 out of its holder 18 and onto the axis Bt.

(ix) The carriage 24 advances along the tool storage matrix until the tool B7 reaches the zero co-ordinate BtO of the axis Bt.

(x) The sliders 25 and 25' move laterally of the carriage 24 to bring the tool B7 to the position Ato.

(xi) The shuttle 27 (which is still at the low level LL) is transferred from the slider 25 back to the elevator 29.

(xii) The elevator 29 is raised to the variable high level, thereby bringing the tool B7 to the exchange position Ex to await the next tool change.

The shuttle 27 and the elevator 29 are shown in detail in FIG. 6. A tool 19 is gripped by the shuttle 27 by means of a gripper device comprising a tubular housing 30 having an outwardly tapered recess 31 opening onto its lower end, the tapered portion 20 of the tool being received in the recess 31. Although not illustrated, an orientation dog is provided within the tapered recess 31 to maintain the tool in an appropriate angular orientation. Disposed within the housing 30 is a ball collet 32 which grips a retention button 33 on the tool shank. The collet 32 is composed of a tubular sleeve 34 which is fixed relative to the housing 30 and which has a portion 35 of enlarged internal diameter at its lower end, and a gripper member 36 which is slidably received within the internal bore of the sleeve 34. At its lower end, the gripper member 36 is recessed to accommodate the retention button 33, the latter normally being retained in position by steel balls 37 disposed in respective transverse bores 38 which open into the recess. When the gripper member 36 is in a raised position as illustrated, the balls 37 are prevented from moving outwardly by the internal wall of the sleeve 34, so that they hold the retention button 33 against disengagement from the member 36. However, when the gripper member 36 is moved to a lowered position wherein the bores 38 are aligned with the internally enlarged portion 35 of the sleeve 34, the balls 37 can more outwardly sufficiently far to enable the retention button 33 to pass thereby.

Movement of the gripper member 36 between its raised and lowered positions is performed by means of an operating member 39 which is movable in a direction perpendicular to the gripper member, the gripper member 36 passing through an aperture 40 in the operating member 39 and being operatively connected to the latter by a pair of pivotal links 41 (only one of which is shown, in broken lines). A pivot pin 42 for the links 41 has a flat-sided portion which is slidably received in an aperture 36' in the gripper member 36. A collar 43 which slidably surrounds an upper end of the member 36 bears against the pivot pin 42 under the action of a spring 44, the spring being engaged between the ciollar 43 and a further collar 43' which is fixed to the gripper member 36. The spring 44 thus allows the gripper member 36 to move relative to the pivot pin 42 within the limits defined by the length of the aperture 36', to compensate for dimensional tolerances of the tool 19. Because it takes the whole weight of the tool 19, the spring 44 must be strong: in practice, the spring is designed to withstand a loading of at least 130 lbs.

The gripper device also includes a slider member 43 which is movable in a direction parallel to the operating member 39 and which has chamfered surfaces 46 and 47 at its ends, respectively. At its end adjacent the chamfered surface 47, the slider member 45 is provided with a pin 48 having an annular recess 49 therein. A spring device 50 is angularly movable about a fixed pivot and has a hermispherical head 51 which slidably engages in a part-spherical recess in the underside of the slider member 45, the device 50 acting to bias the slider member to the left or right according to the position of the latter.

Provided at one end of a fixed part of the shuttle 27 are a pair of lower wedge-shaped recesses 52 and a pair of upper wedge-shaped recesses 53, the recesses 53 being disposed inboard of the recesses 52. In FIG. 6, only one recess of each pair is shown. When the shuttle 27 is mounted on the slider 25 of the tool selector device, the recesses 52 and 53 are engaged from beneath by correspondingly shaped projectons 54 and 55 respectively, which serve to support the shuttle on the slider. To lock the shuttle to the slider positively, the chamfered surface 46 on the slider member 45 engages under a chamfered abutment 56 on the slider 25, such engagement being assisted by a leftward bias applied to the slider member 45 by the spring device 50. Operation of the shuttle 27 to grip and release a tool is performed by means of a slidable actuator 57 disposed between the projections 52, the actuator 57 having an upwardly-facing hooked formation 58 thereon which engages a downwardly-facing hooked formation 59 on one end of the operating member 39.

At the opposite end of the fixed part of the shuttle 27 are provided a pair of lower wedge-shaped recesses 60 and a pair of upper wedge-shaped recesses 61, the recesses 61 being disposed inboard of the recesses 60. Again, only one recess in each pair is illustrated in FIG. 6. When the shuttle 27 is mounted on the elevator 29, the recesses 60 and 61 are engaged from beneath by correspondingly shaped projections 62 and 63 respectively which serve to support the shuttle on the elevator. To lock the shuttle to the elevator positively, the chamfered surface 47 on the slider member 45 engages under a chamfered abutment 64 on the elevator. Operation of the shuttle 27 to grip and release a tool can now be performed by means of a ram-operated actuator 65, the actuator 65 having an upwardly-facing hooked formation 66 thereon which engages a downwardly-facing hooked formation 67 on the operatng member 39.

FIG. 6 shows the shuttle 27 prior to being transferred from the slider 25 to the elevator 29. Under this condition, the elevator occupies a rest position in which the projections 62 and 63 are aligned with but disposed approximately 30 mm below the recesses 60 and 61 respectively, and the hooked formation 66 on the actuator 65 is similarly aligned with and disposed below the hooked formation 67 on the operating member 39. Also in this position, an upwardly-facing formation 68 on a further ram-operated actuator 69 is aligned with and disposed below the annular recess 49 in the pin 48.

In order to transfer the shuttle 27 from the slider 25 to the elevator 29, the latter is raised by approximately 50 mm from its rest position to engage the mutually aligned parts described above. At this point, a block (not shown) on the vertical slide 28 obstructs a block (also not shown) on the actuator 69 to prevent further upward movement of the elevator 29. The actuator 69 is then operated to more the slide member 45 to the right (as viewed in FIG. 6), thereby disengaging the chamfered surface 46 from beneath the abutment 36 and engaging the chamfered surface 47 beneath the abutment 64. At the same time, the block on the actuator 69 is moved clear of the block on the vertical slide 28 so that further upward movement of the elevator 29 can commence. The two blocks thus act as a mechanical interlock to ensure that the shuttle 27 cannot be raised by the elevator 29 until it has been fully engaged with the latter and disengaged from the slider 25. The geometry of the recesses 52, 53 and the projections 34, 55 is such as to allow the elevator 29 to lift the shuttle 27 off the slider 25 once the slider member 45 has been disengaged from the abutment 56.

Transfer of the shuttle 27 from the elevator 29 back to the slider 25 is performed by reversing the above-described sequence of operations.

In an alternative embodiment (not shown), the vertical slide 28 and elevator 29 are omitted, and the shuttle 27 is permanently secured to the slider 25 and is raised to the variable high level by the tool selector device itself.

In order to transfer a tool from the exchange position to the work spindle and vice versa, a tool transfer and interchange mechanism is provided on the machine tool itself. This mechanism is illustrated in detail in FIGS. 7, 8 and 9, and comprises a subsidiary beam 70 which is attached to the main beam 13 so as to extend across the front of the spindle head 10. A carriage 71 is mounted on a track which extends longitudinally of the subsidiary beam 70, so that the carriage 71 is movable in parallel to the spindle heat 10 along the Y axis of the machine tool. Such movement of the carriage 71 is effected by means of a hydraulic motor and a sprocket-and-chain drive or other suitable means, deceleration and dead stop devices being provided at each end of the carriage travel. The track is positioned laterally so that the carriage 71 when in an extreme leftward position as viewed in FIG. 7 is positioned generally above the pick-up axis P, and is positioned vertically so that a tool held by the carriage at a park position (to be described later) does not protrude below the face of the work spindle 11, It will be manifest that the carriage 71 will move vertically with the spindle head 10 by virtue of the subsidiary beam 70 being mounted on the main beam 13.

Added support is given to the subsidiary beam 70 by a bracket (not shown) attached to the front of the spindle head 10 and containing suitable bearing assemblies; this ensures that the subsidiary beam is held in the correct position with respect to the spindle head as the latter tracks along the main beam 13. In a particular example of such an arrangement, the bracket includes a pair of arm portions which extend forwardly from the spindle head 10, and the bearing assemblies are disposed in opposed generally U-shaped recesses in the free ends of the arm portions.

Housed in the carriage 71 are two vertically mounted sliding member 72 actuated by hydraulic rams or other suitable means. The members 72 carry a mounting block 73 of their lower ends, and an interchange arm 74 is mounted on the block 73 by way of a spindle 75 for rotation about a vertical axis. The interchange arm 74 comprises a slide member 76 which is movable horizontally relative to the block 73 and a pair of jaw devices 77 provided respectively at the ends of the slide member 76. The jaw devices 77 are capable of a 90° wrist movement in opposite directions, as indicated by arrows 78 in FIG. 8. The whole interchange arm 74 can be indexed by 90° or 180° about the rotation axis of the spindle 75.

As indicated in FIG. 7, the hydraulically actuated rams are operable to raise and lower the interchange arm 74 between a high level park position, an intermediate level position (referenced 74') in which the jaw devices 77 are aligned with the shank of a tool 19 when the latter is mounted in the work spindle 11, and a low level position (referenced 74") wherein the interchange arm can rotate without obstruction beneath the spindle head 10. From FIG. 7, it will also be seen that the exchange position Ex at which the elevator 29 holds a tool 19 in readiness for transference to the work spindle corresponds to a position wherein the jaw devices 77 are aligned with the shank of the tool when the interchange arm is in its intermediate level position 74'.

Referring to FIG. 9, when a tool change is to be performed the carriage 71 is moved along the subsidiary beam 70 into a position in which it becomes latched to the spindle head 10 by means of a latch device 79. The position thus occupied by the carriage for changing a tool in the vertical work spindle 11 is indicated in chain-dotted lines and referenced 71'. As will be explained in detail later, during tool changing the interchange arm 74 is rotated in a horizontal plane about the axis of the spindle 75. When the right-angle head 15 (indicated in broken lines) is fitted to the work spindle 11 to give horizontal spindle rotation, it is necessary to offset the carriage from the position 71' in order that the interchange arm 74 during its rotation does not foul the spindle nose of the right-angle head. Such an offset is achieved by mounting the latch device 79 on an arm 80 which can be extended relative to the carriage 71 between three positions. Movement of the arm between a first and second of these positions offsets the carriage to a suitable park position (indicated in solid lines) for tool change when the right-angle head 15 is fitted. Movement of the arm 80 between the second and third positions is used to move the carriage 71 bodily along the subsidiary beam 70 for unloading tools from and loading tools in the right-angle head 15.

The manner in which a tool changing operation is performed will now be explained. For the purpose of this explanation, it will be assumed that a tool A1 is presently mounted in the work spindle, a tool B4 previously mounted in the work spindle and now held by one of the jaw devices 77 has been returned to a position near the pick-up axis P, and a tool B7 which is to be mounted next in the work spindle has been delivered by the elevator 29 to the exchange position Ex where it is being held by the shuttle 27.

The sequence of operations by which the tool transfer and interchange mechanism exchanges the tool B4 for the tool B7 will be described first, with reference to FIGS. 10A to 10C. Initially, the interchange arm 74 is disposed in its high level park position with the empty jaw device (referenced 77') adjacent the pick-up axis P, as indicated at I in FIG. 10A.

(a) The hydraulically actuated rams lower the interchange arm 74 to its intermediate level position (as indicated by arrow a in FIG. 10A).

(b) The slide member 76 advances (arrow b, FIG. 10A) so that the jaw device 77' can grip the shank of the tool B7.

(c) The shuttle 27 releases tool B7, and the hydraulically actuated ram lowers the interchange arm 74 to its low level position (arrow c, FIG. 10A).

(d) The interchange arm 74 rotates through 180° (arrow d, FIG. 10B) and the slide member 76 advances (arrow $d_2$, FIG. 10B) to bring the tool B4 onto the pick-up axis P.

(e) The interchange arm 74 is raised to its intermediate level position (arrow e, FIG. 10B) thereby placing the tapered portion 20 of tool B4 in the tapered recess in the shuttle 27. The ball collet of the shuttle then engages the retention knob on tool B4 to retain the latter.

(f) The jaw device 77 releases the tool B4 and the slide member 76 retracts away from the tool B4 (arrow f, FIG. 10C).

(g) The shuttle 27 is lowered (arrow g, FIG. 10C) to its low level position, whereupon tool B4 is replaced in its storage location in accordance with the sequence of operations (i) to (iv) described above.

(h) The interchange arm 74 is lowered to its low level position (arrow $h_1$, FIG. 10C) and is rotated through 180° (arrow $h_2$, FIG. 10C).

(j) The interchange arm 74 is raised to its high level park position (arrow j, FIG. 10C).

It may be possible to rotate the interchange arm 74 through 180° and raise it to the high level park position without the necessity of first lowering it to the low level position.

FIGS. 11A to 11D illustrate a subsequent sequence of operations for changing the tool B7 for the tool A1 when the work spindle 11 is used withou the right-angle attachment 15 as follows:

(k) At a suitable programmed time the carriage 71 moves along the subsidiary beam 70, decelerates and latches onto the spindle head. The hydraulic motor which drives the carriage 71 then goes into a "free-wheel" mode. At this point, the mechanism is in the position indicated at II in FIG. 11A.

(l) The carriage 71 moves with the spindle head 10 along the Y axis of the machine tool until a tool change is required, whereupon the work spindle 11 retracts to a tool change position.

(m) The interchange arm 74 is lowered to its intermediate level position (arrow $m_1$, FIG. 11A) and is indexed through 90° in an anticlockwise direction (arrow $m_2$, FIG. 11A).

(n) The slide member 76 moves to advance the empty jaw device 77 onto the tool A1 (arm n, FIG. 11B). The jaw device 77 then grips tool A1 and a tool lock mechanism in the work spindle 11 is released.

(o) The interchange arm 74 is lowered to its low level position (arrow $O_1$, FIG. 11B) thereby removing the tool A1 from the work spindle 11, and is indexed clockwise through 180° (arrow $O_2$, FIG. 11B).

(p) The slide member 76 is advanced (arrow p, FIG. 11C) to bring tool B7 into alignment with the work spindle axis.

(q) The interchange arm 74 is raised to its intermediate level position (arrow q, FIG. 11C), thereby placing tool B7 in the work spindle 11 where it is retained by the aforementioned tool lock mechanism.

(r) The jaw device 77' releases tool B7 and the slide member 76 moves to retract the jaw device 77' (arrow r, FIG. 11C).

(s) The interchange arm 74 is indexed through 90° in an anticlockwise direction (arrow $s_1$, FIG. 11D) and is then raised to its high level park position (arrow $s_2$, FIG. 11D).

(t) The carriage 71 unlatches from the spindle head 10 and returns along the subsidiary beam 70 to its starting position (arrow t, FIG. 11D) where it decelerates and stops.

The sequence of operations to transfer a new tool to the work spindle is then repeated as required.

Referring now to FIGS. 12 and 13A to 13F, when the right-angle head 15 is attached to the ram 10a the following sequence of operations is performed after steps (a) to (j) above to effect a tool change. Here, it is assumed that the right-angle head 15 is working in the X axis of the machine tool.

(k') At a suitable programmed time the carriage 71 moves along the subsidiary beam 70, decelerates and latches onto the spindle head 10. Because the arm 80 is now extended, the carriage 71 comes to rest in the position indicated by solid lines in FIG. 12.

(l') The carriage 71 moves with the spindle head 10 along the Y axis of the machine tool (in both feed and rapid traverse modes) until a tool change is required.

Figure 12:
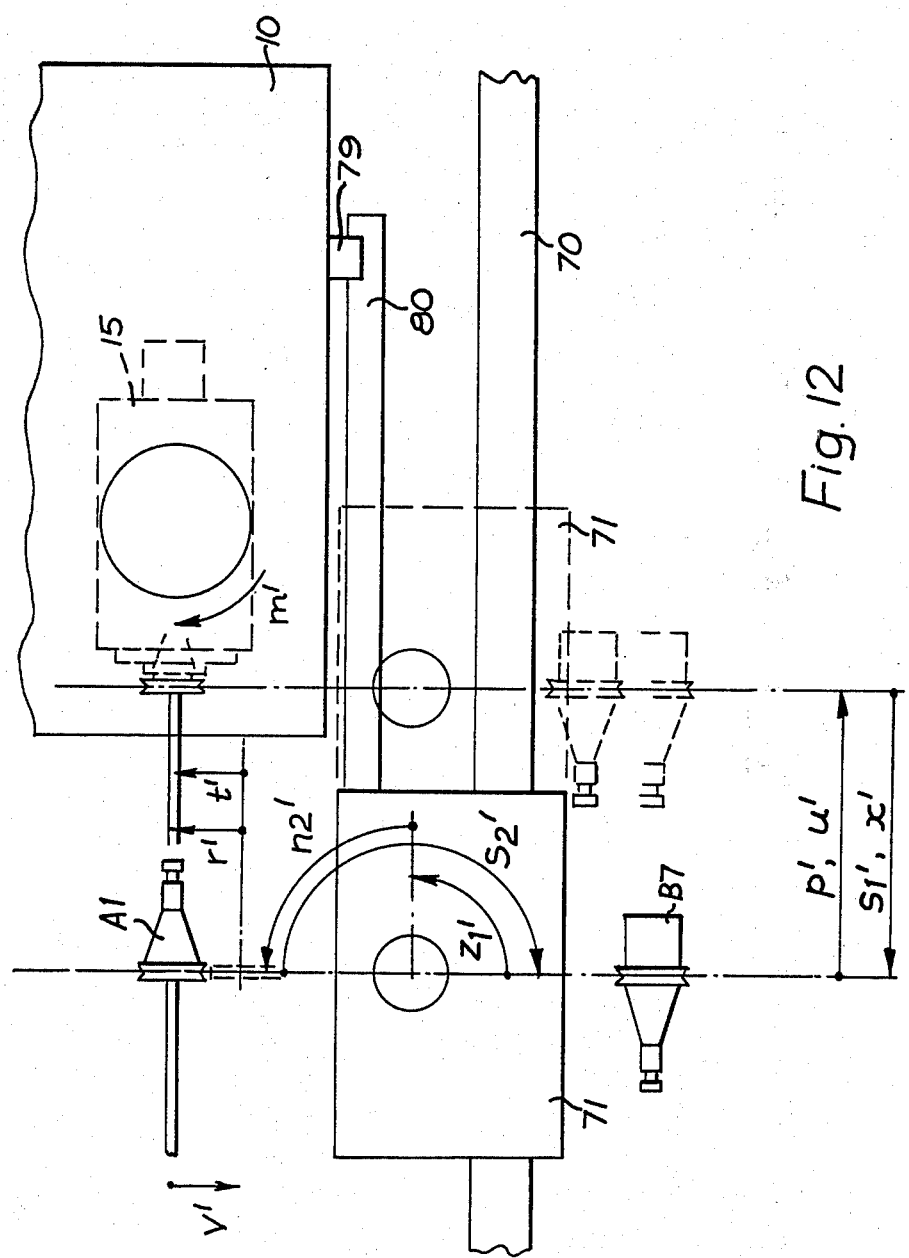
FIG. 12 shows in plan view a subsequent sequence of operations during tool changing when the work spindle is oriented horizontally.

(m') An indexing unit on the underside of the ram 10a, indexes the right-angle head 15 as indicated by arrow m' in FIGS. 12 and 13A to present the tool A1 held therein towards the tool storage matrix, and the ram 10a is retracted into a tool change position.

(n') The interchange arm 74 is lowered into its intermediate level position (arow $n_1'$, FIG. 13A) and is indexed by 90° in an anticlockwise direction (arrow $n_2'$, FIGS. 12 and 13A).

(o') The jaw devices rotate through 90° at the wrist (arrow o', FIG. 13A) to bring the tool B7 into a horizontal disposition.

(p') By retraction of the arm 80, the carriage 71 moves bodily (arrow p', FIGS. 12 and 13A) into the position indicated by broken lines, thereby bringing the empty jaw device 77 into the same vertical plane as the tool A1 held in the right-angle head 15.

(q') The interchange arm 74 is lowered into its low level position (arrow q', FIG. 13A).

(r') The slide member 76 moves so as to advance the empty jaw device 77 onto the tool A1 (arrow r'), FIGS. 12 and 13B). The jaw device then grips the tool A1, and a tool lock mechanism on the right-angle head 15 releases the tool A1.

(s') The arm 80 is extended to move the carriage 71 bodily (arrow $s_1'$, FIGS. 12 and 13A) back to the position indicated in solid lines, thereby removing the tool A1 from the right-angle head 15. The interchange arm 71 is then rotated clockwise through 180° (arrow $s_2'$, FIGS. 12 and 13C) to present tool B7 to the right-angle head.

(t') The slide member 76 is advanced (arrow t', FIGS. 12 and 13C) to bring tool B7 onto the axis of the right-angle head.

(u') The arm 80 is retracted once again to move the carriage 71 (arrow u', FIGS. 12 and 13D) into the position indicated by broken lines, thereby placing tool B7 in the right-angle head where it is retained by the aforementioned tool lock mechanism.

(v') The jaw device 77' releases the tool B7, and the slide member 76 is moved so as to retract the jaw device away from the tool B7 (arrow v', FIGS. 12 and 13E).

(w') The interchange arm 74 is raised to its intermediate level position (arrow w', FIG. 13F).

(x') The arm 80 extends once again to move the carriage 71 (arrow x', FIGS. 12 and 13F) back into the position indicated by solid lines.

(y') The jaw devices rotate back through 90° at the wrist (arrow y', FIG. 13F).

(z') The interchange arm 74 is indexed through 90° in an anticlockwise direction (arrow $z_1'$, FIGS. 12 and 13F) and is raised into its high level park position (arrow $z_2'$, FIG. 13F). The carriage 71 then unlatches from the spindle head 10 and returns along the subsidiary beam 70 to its starting position where it decelerates and stops.

The entire sequence of operations is then repeated as desired.

It will be appreciated that when the machining programs calls for the attachment or detachment of the right-angle head 15 it is necessary, if sequence time is not to be wasted, for a combined vertical/horizontal or horizontal/vertical sequence to be introduced.

A typical vertical/horizontal sequence would be as follows:

Assume that the interchange arm 74 is in its high level position and the carriage 71 is latched onto the spindle head 10 in its normal position for vertical tool changing (i.e. not offset as in FIG. 11A. The next tool required (which is to be inserted into the right-angle head after attachment) is held in the jaw device 77' and the jaw device 77 is open. The indexing unit on the underside of the ram 10a is in the correct angular position to accept the right-angle head. The tool to be removed is in the vertical spindle.

Initially, operations (l), (m) and (n) described above are performed to remove the tool from the vertical spindle. At the completion of operation (n), the interchange arm 74 lowers to its low level position, removing the tool from the work spindle. Then rotating through 90° only (clockwise), the interchange arm 74 retracts to the high level park position. At this stage, tools are held in both jaw devices of the interchange arm, the next tool required being in device 77' and the tool just removed being in device 77.

In order to attach the right-angle head 15 to the spindle head 10, the spindle head is first removed to a position wherein it is disposed over the right-angle head, the latter being held at a low level by an elevator (not shown) in a park position. The elevator then raises the right-angle head 15 to meet the work spindle ram 10a and indexor (which are descending), and the right-angle head locks onto the latter. The elevator returns to its park position, while the work spindle rises to the tool change position, i.e. with the horizontal axis of the right-angle head 15 coincident with the low level position of the interchange arm 74.

The new tool is then loaded in the right-angle head as follows. The latch arm 80 extends so as to offset the carriage 71 into the start position for a horizontal tool change sequence, and the interchange arm 74 is lowered to its low level position. The interchange arm then rotates clockwise through 90°, and the jaw devices undergo a 90° wrist movement to present the tools horizontally. The slide member 76 moves the new tool onto the axis of the right-angle head.

The new tool held in jaw device 77' is now in the correct attitude and position for insertion into the right-angle head 15. Such insertion is accomplished by contraction of the latch arm 80, which causes the carriage 71 to move towards the right-angle head along the subsidiary beam 70. After insertion and locking of the tool in the right-angle head, the slide member 76 moves away from the axis of the right-angle head and the interchange arm 74 is raised to its intermediate level position. The latch arm 80 then extends, moving the carriage 71 away from the spindle head 10, and a wrist movement returns the jaw devices (and also the removed tool in jaw device 77) to the vertical position. Finally, the interchange arm 74 rotates anticlockwise through 90° and moves up to the high level position ready for return to the exchange position on the pick-up axis.

A typical horizontal/vertical sequence would be as follows:

Assume that the interchange arm 74 is in its high level position and the carriage 71 is latched onto the spindle head 10 in its normal position for horizontal tool changing (i.e. offset) as in FIG. 13A. The next tool required (which is to be inserted into the vertical spindle after the right-angle head has been detached) is held in the jaw device 77' and the jaw device 77 is open. The indexing unit on the underside of the ram 10a has indexed the right-angle head into the correct angular position for tool changing.

Initially, operations (l') to (r') as described above are performed to remove the tool from the right-angle head. At the completion of operation (r') the latch arm 80 extends, moving the carriage 71 away from the right-angle head and thereby removing the tool therefrom. The interchange arm 74 then rotates clockwise through 90°, and a 90° wrist movement of the jaw devices rotates the tools into the vertical position. Thereafter, the interchange arm rises to its high level park position and the latch bar 80 retracts, moving the carriage 71 to its position for vertical tool changing.

In order to detach the right-angle head 15 from the spindle head 10, the spindle head is first moved to a position over the aforementioned elevator for the right-angle head. The work spindle together with the right-angle head then moves downwardly to meet the elevator, which is rising. The right-angle head unlocks from the work spindle, and the elevator descends taking the right-angle head to its park position. The work spindle then rises to the vertical tool change position.

In order to load the new tool in the vertical spindle, the interchange arm 74 is lowered to its low level position and is rotated clockwise through 90°. The slide member 76 then advances towards the work spindle to place the new tool on the axis of the latter, whereupon the interchange arm 74 is raised to insert the tool into the work spindle, where it is then locked in situ. The tool change operation is then completed by operations (r), (s) and (t) described above.

I claim:

1. A machine comprising:
   (a) a work head adapted to mount a tool therein;
   (b) means operative to move the work head in a predetermined direction;
   (c) means defining a tool exchange location where tools are presented for mounting in said work head and are received after removal from said work head; and
   (d) a tool transfer mechanism operative to change the tool mounted in said work head, said tool transfer mechanism including:
   (i) a carriage;
   (ii) means operative to move said carriage in said predetermined direction between said work head and said means defining the tool exchange location;
   (iii) latch means operable to latch said carriage positively and detachably to said work head for movement with said work head in said predetermined direction, said latch means including an arm which can be extended and retracted relative to said carriage in said predetermined direction and a latch device for latching said arm to said work head; and (iv) a pair of tool grippers carried by said carriage, one of said tool grippers being arranged to grip a tool removed from said work head during movement of said carriage from said work head to said means defining the tool exchange location, the other of said tool grippers being arranged to grip a replacement tool for mounting in said work head during movement of said carriage from said means defining the tool exchange location to said work head.

2. A machine tool comprising:
(a) a work head adapted to mount a tool therein;
(b) means operative to move the work head in a predetermined direction;
(c) means defining a tool exchange location where tools are presented for mounting in said work head and are received after removal from said work head; and
(d) a tool transfer mechanism operative to change the tool mounted in said work head, said tool transfer mechanism including:
(i) a carriage;
(ii) means operative to move said carriage in said predetermined direction between said work head and said means defining the tool exchange location;
(iii) latch means operable to latch said carriage positively and detachably to said work head for movement with said work head in said predetermined direction; and
(iv) a pair of tool grippers carried by said carriage, one of said tool grippers being arranged to grip a tool removed from said work head during movement of said carriage from said work head to said means defining the tool exchange location, the other of said tool grippers being arranged to grip a replacement tool for mounting in said work head during movement of said carriage from said means defining the tool exchange location to said work head.

3. The machine tool according to claim 2, further comprising means operative to present each tool at said means defining the tool exchange location in the same orientation as it is normally mounted in said work head, and each said tool gripper is capable of angular movement to change the orientation of the tool.

4. The machine tool according to claim 3, further comprising means operative to move said tool grippers in a preselected direction to insert each tool into and remove each tool from said work head, and means operative to move each said tool gripper angularly about an axis generally perpendicular to said preselected direction.

5. The machine tool according to claim 2, further comprising means operative to effect relative movement between said tool grippers and said work head in a preselected direction to insert each tool into and remove each tool from said work head, an arm mounted on said carriage and carrying said tool grippers, and means operative to rotate said arm about an axis generally parallel to said preselected direction.

6. The machine tool according to claim 5, further comprising means operative to move said arm translationally relative to said carriage in a direction perpendicular to said preselected direction.

7. The machine tool according to claim 5, further comprising means operative to move said arm translationally relative to said carriage in a direction parallel to said preselected direction between a first position in which the tool mounted in said work head can be gripped by said one tool gripper, a second position in which said arm can rotate without obstruction by said work head, and a third, rest position which said arm normally occupies during movement of said carriage between said work head and said means defining the tool exchange location.

8. The machine tool according to claim 7, wherein said first position is at a predetermined level with respect to said preselected direction, and said means defining the tool exchange location is also disposed at said predetermined level with respect to said preselected direction.

* * * * *